US006832727B2

(12) United States Patent
Veligdan

(10) Patent No.: US 6,832,727 B2
(45) Date of Patent: Dec. 21, 2004

(54) INTEGRATED DISPLAY SCANNER

(75) Inventor: James T. Veligdan, Manorville, NY (US)

(73) Assignee: Brookhaven Science Associates, Upton, NY (US)

(*) Notice: Subject to any disclaimer, the term of this patent is extended or adjusted under 35 U.S.C. 154(b) by 0 days.

(21) Appl. No.: 09/302,941

(22) Filed: Apr. 30, 1999

(65) Prior Publication Data

US 2002/0050523 A1 May 2, 2002

(51) Int. Cl.[7] .............................................. G06K 7/10
(52) U.S. Cl. ..................... 235/462.32; 235/462.01; 235/462.36; 235/462.42; 235/462.43; 235/454; 250/234; 250/227.11
(58) Field of Search ................. 235/462.01, 472, 235/454, 462; 250/227.26

(56) References Cited

U.S. PATENT DOCUMENTS

| | | | | |
|---|---|---|---|---|
| 4,720,824 A | * | 1/1988 | Hayashi | 369/44 |
| 5,248,977 A | * | 9/1993 | Lee et al. | 342/25 |
| 5,381,502 A | | 1/1995 | Veligdan | |
| 5,410,141 A | | 4/1995 | Koenck et al. | |
| 5,455,882 A | | 10/1995 | Veligdan | |
| 5,464,972 A | * | 11/1995 | Massieu et al. | 235/462 |
| 5,577,148 A | * | 11/1996 | Kamatani | 348/164 |
| 5,633,487 A | * | 5/1997 | Schmutz et al. | 235/462.22 |
| 5,747,796 A | * | 5/1998 | Heard et al. | 250/227.26 |
| 5,786,585 A | * | 7/1998 | Eastman et al. | 235/472 |
| 6,045,046 A | * | 4/2000 | Detwiler | 235/114 |
| 6,126,075 A | * | 10/2000 | Agabra et al. | 235/454 |

OTHER PUBLICATIONS

Beiser et al, "Ten Inch Planar Optic Display," Proceedings of the International Society for Optical Engineering (SPIE), vol. 2734, Apr. 1996, 9 pages.
Yoder, "The State–of–the–Art in Projection Display: An Introduction to the Digital Light Processing DLP," Texas Instruments Web Site, Mar. 1997, 5 pages.
3 M, "3M Transmissive Right Angle Film (TRAF) II, " product literature, 1996, four pages.

* cited by examiner

Primary Examiner—Michael G. Lee
Assistant Examiner—Ahshik Kim
(74) Attorney, Agent, or Firm—Reed Smith LLP; William J. McNichol, Jr.; Matthew J. Esserman

(57) ABSTRACT

A display scanner includes an optical panel having a plurality of stacked optical waveguides. The waveguides define an inlet face at one end and a screen at an opposite end, with each waveguide having a core laminated between cladding. A projector projects a scan beam of light into the panel inlet face for transmission from the screen as a scan line to scan a barcode. A light sensor at the inlet face detects a return beam reflected from the barcode into the screen. A decoder decodes the return beam detected by the sensor for reading the barcode. In an exemplary embodiment, the optical panel also displays a visual image thereon.

25 Claims, 2 Drawing Sheets

INTEGRATED DISPLAY SCANNER

This invention was made with Government support under contract number DE-AC02-98CH10886, awarded by the U.S. Department of Energy. The Government has certain rights in the invention.

BACKGROUND OF THE INVENTION

The present invention relates generally to barcode scanners, and, more specifically, to video displays cooperating therewith.

In a typical retail store, such as a grocery supermarket, a point of sale (POS) terminal permits a clerk to tally products being purchased by a customer. A typical POS terminal includes a barcode scanner along which the individual products are swiped for reading or scanning corresponding barcodes thereon.

Barcodes have various configurations, with the typical barcode found in retail establishments being a one-dimensional barcode configured in the Universal Product Code (UPC) format. In this format, a series of alternating dark bars and white spaces of varying width are used to encode desired information, such as the identity of the product for which the price thereof may be obtained from a corresponding price database.

A typical barcode scanner includes a laser for emitting a continuous red laser beam which is reflected off a rotating spinner and against several pattern mirrors that produce different scan lines which typically intersect in a pattern for increasing the likelihood of a successful barcode scan.

In operation, the product containing the barcode is swiped across a window of the scanner so that at least one of the scan lines may traverse the bars and spaces of the barcode in turn. Light is absorbed by the dark bars and reflected from the white spaces in a return path back into the barcode scanner in which a photodiode light detector detects the reflected light which is then suitably decoded. Since the barcode may be presented in front of the scanner window at various orientations, the scan pattern is configured to improve a successful read irrespective of the barcode orientation.

However, the number of scan lines in the resulting pattern is limited by the number of mirror facets on the spinner and the number of cooperating pattern mirrors. In practice, therefore, the barcode may have to be repeatedly presented to the scanner for ensuring a successful read and decoding thereof.

The decoded barcode signal is then used in a price lookup database for obtaining the corresponding price of the associated product which is then displayed on a printed receipt, or in a video display screen prior to receipt printing. In this way, individual products are identified by their barcodes and tallied in a list for determining the total amount of the transaction, which may then be completed.

Typical barcode scanners have limited capability, and are separate from the video displays. This increases system complexity and corresponding cost.

Accordingly, it is desired to provide an improved barcode scanner, which may be additionally integrated with a video display screen for reducing cost and complexity.

BRIEF SUMMARY OF THE INVENTION

A display scanner includes an optical panel having a plurality of stacked optical waveguides. The waveguides define an inlet face at one end and a screen at an opposite end, with each waveguide having a core laminated between cladding. A projector projects a scan beam of light into the panel inlet face for transmission from the screen as a scan line to scan a barcode. A light sensor at the inlet face detects a return beam reflected from the barcode into the screen. A decoder decodes the return beam detected by the sensor for reading the barcode. In an exemplary embodiment, the optical panel also displays a visual image thereon.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
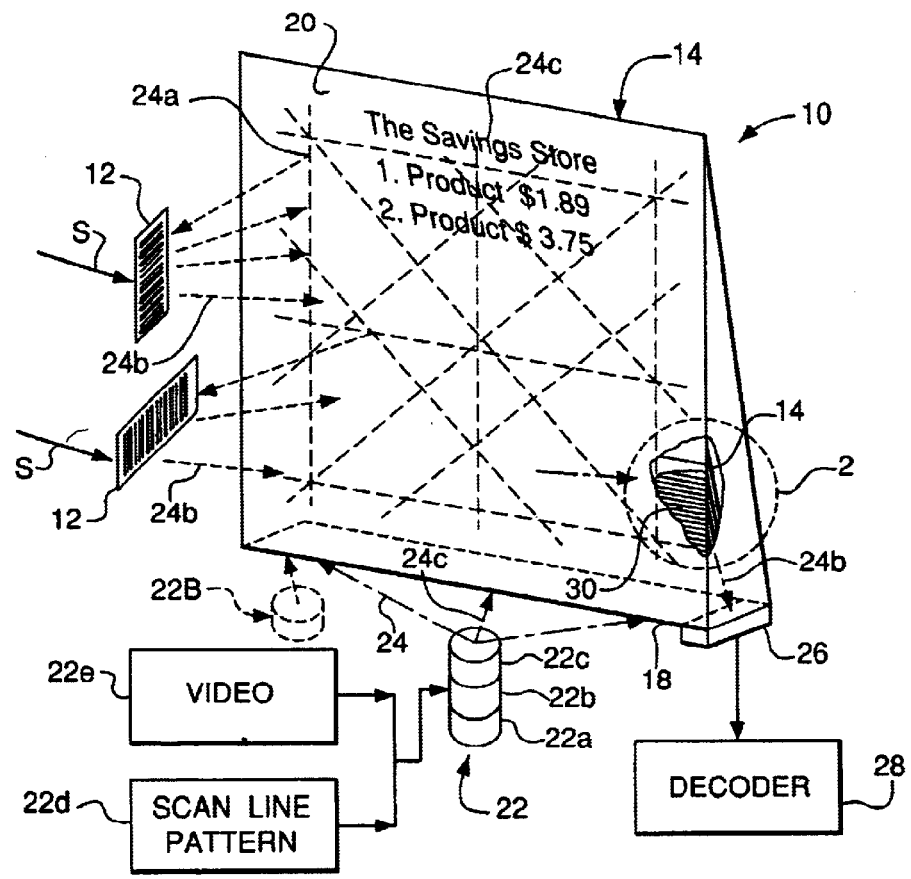
FIG. 1 is a schematic representation of an integrated display scanner in accordance with an exemplary embodiment of the present invention.

Illustrated in FIG. 1 is an integrated display scanner 10 in accordance with an exemplary embodiment of the present invention for reading or scanning a barcode 12, typically attached to a corresponding product (not shown). The barcode may have any conventional configuration, such as the one-dimensional UPC format in which a series of alternating dark bars and white spaces of varying width are used to encode any desired information, such as the identity of the product to which the barcode is attached. The barcode 12 is shown in two exemplary positions including a picket fence orientation and a ladder orientation, with various diagonal orientations therebetween also being possible.

Figure 2:
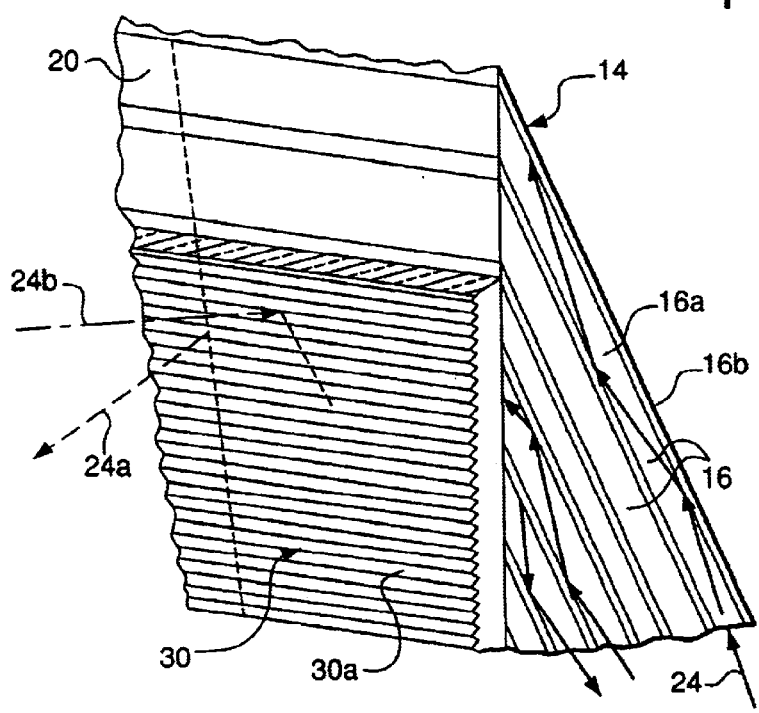
FIG. 2 is an enlarged, partly sectional view through a portion of the optical panel illustrated in FIG. 1 within the circle labeled 2, showing a stacked optical waveguide construction thereof in accordance with an exemplary embodiment.

The scanner is an assembly of components including an optical panel 14 in the form of a plurality of stacked together optical waveguides 16, shown in more detail in FIG. 2. Each waveguide includes a central transparent core 16a having a first index of refraction, and may be formed of an optical plastic or glass. The cores are laminated between cladding layers 16b having a second index of refraction lower than that for the cores for providing substantially total internal reflection of light transmitted through the cores. The cladding may be a suitable plastic or epoxy for example.

As shown in FIG. 1, the waveguides 16 are in the exemplary form of planar ribbons or sheets stacked atop each other for defining an inlet face 18 at one end for receiving input light, and a display screen 20 at an opposite end for displaying the light.

In an exemplary embodiment, the waveguides 16 are oblique to the inlet face 18 and the screen 20. The screen may be disposed at a small acute bevel angle with the waveguides of about 5° for example, with the inlet face 18 being generally perpendicular to the transmission axes of the waveguides, and with a relatively thin collective depth or thickness thereof. For example, there may be about 500 waveguides of about 50 microns thickness each which are stacked together in parallel sheets for the full width of the panel and its screen. The height of the screen is defined by the total number of exposed outlet ends of the waveguides due to the bevels thereat.

The optical panel 14 is also referred to as a planar optical display (POD) and may have various configurations. This type of display was originally patented in U.S. Pat. No. 5,381,502 which discloses various advantages thereof as a display screen. In U.S. Pat. No. 5,455,882 the optical display is incorporated with photodiode array light sensors for permitting interactive use of the panel.

In accordance with the present invention, this type of optical panel 14 may now be used as a barcode scanner for reading the barcodes 12 illustrated in FIG. 1 in a novel manner.

More specifically, the scanner 10 includes means in the form of a projector 22, illustrated schematically in FIG. 1, which are optically aligned with the panel inlet face 18 for projecting a scan beam of light 24 into the panel for transmission therethrough and from the screen 20 as a scan line 24a to scan the barcode 12. The scan line 24a may have any suitable orientation on the screen 20 for traversing the barcode 12 presented thereto from which a return beam 24b of light reflected from the barcode is directed toward the screen 20 from which the light was originally emitted.

A light detector or sensor 26 is disposed in optical communication with the panel inlet face 18 for detecting the return beam 24b reflected from the barcode into the screen 20. A decoder 28 is operatively joined with the sensor 26 for decoding the return beam 24b detected by the sensor to read the corresponding barcode 12. The decoder 28 may take any conventional form such as those used in conventional barcode scanners which include suitable electronics or a central processing unit (CPU) configured for decoding the return beam.

A particular advantage of the present invention is the integration of the optical panel 14 for both transmitting the scan beam 24 in suitable scan lines to traverse the barcode, while also providing an optical path for the return beam 24b which is detected by the sensor 26 for corresponding decoding.

In the exemplary embodiment illustrated in FIG. 1, the projector 22 is in the form of a video display projector configured to display multiple scan lines 24a in a suitable pattern thereof as a video image.

The projector 22 is illustrated schematically in FIG. 1 and includes a suitable light source 22a for initially producing the light beam 24. The light source may be a simple incandescent bulb, or any other light source as desired.

A light modulator 22b is operatively joined to the light source for modulating the light therefrom to form one or more of the scan lines 24a, and the resulting pattern thereof. The modulator 22b may be a conventional Liquid Crystal Display (LCD) having a matrix of elements which selectively block or transmit light for producing the desired scan line pattern.

The projector 22 also includes suitable image optics 22c for distributing or broadcasting the light beam 24 horizontally and vertically across the panel inlet face 18 for transmission through the waveguides to display the pattern on the screen. The image optics 22c may include focusing and expanding lenses and mirrors as required, and as further described hereinbelow in another embodiment.

Since the projector 22 may be in the form of a video display projector it may include a suitable pattern generator 22d for defining a plurality of the scan lines 24a with different orientations or inclinations in a collective scan line pattern at the screen 20 for reading different orientations of the barcode 12. The pattern generator may have any conventional form capable of generating video images, but specifically configured for generating a desired pattern of scan lines. Whereas the scan line pattern in a conventional barcode scanner is limited by the facets of the spinner and number of pattern mirrors, the pattern produced by the generator may have any practical number of scan lines since they may be electronically generated. For example, the scan line pattern may be defined by corresponding software in a computer driven projector.

Shown in phantom line on the screen of FIG. 1 is an exemplary scan line pattern including three each of vertical, horizontal, left diagonal and right diagonal scan lines extending over the full extent of the rectangular screen and intersecting each other where required. The screen 20 may have any suitable size, and the scan pattern may cover the entire screen or any desired portion thereof for producing a scanning zone over which the barcodes 12 may be swiped or traversed as designated by the direction arrow labeled S.

Since the originally defined planar optical panel introduced in the patents identified above was configured for displaying a video image, the corresponding screen in that panel was suitably frosted for diffusing the image light received thereat for improving the angular field of view. However, diffusing the scan lines at the screen 20 will limit the practical use of the optical panel for scanning barcodes swiped thereacross closely adjacent thereto. Accordingly, instead of frosting the screen 20, a light coupler 30 is preferably disposed atop the screen 20, as shown in more detail in FIG. 2, for transmitting the scan lines 24a outwardly from the screen for improving the depth of field of the scanning zone through which the barcodes may be swiped.

In the exemplary embodiment illustrated in FIG. 2, the coupler 30 is preferably configured to turn the scan beam 24 at the screen in a range of about 45° to about 90° in view of the shallow beveled edges of the waveguides. In a preferred embodiment, the coupler 30 includes fresnel prismatic grooves 30a which may be in the form of a Transmissive Right Angle Film (TRAF) which is commercially available from the 3M Company of St. Paul, Minn. Such a prismatic coupler 30 effectively turns and redirects the scan beams 24 traveling through the individual waveguides 16 for transmission outwardly from the coupler for scanning the barcodes presented thereto. The prismatic coupler is also effective for receiving the return beam 24b and turning it into the individual waveguide 16 for its reverse path to the light sensor 26.

The light sensor 26 in its simplest form may be a photodiode adjoining the panel inlet face 18. Since the return beam 24b is carried along the full width of the individual waveguides 16, the sensor 26 may be placed at any suitable location along the inlet face 18. For example, the sensor 26 may be disposed at either end of the inlet face out of the viewing range of the projector 22 so as not to block the outbound scan beam 24.

In a preferred embodiment, the light sensor 26 is in the form of a photodiode array adjoining respective ones of the waveguides for providing redundant detection of respective ones of the return beams 24b. A suitable light sensor is a linear image sensor in the form of a monolithic, self-scanning photodiode array having 1,024 diodes 26a, as shown for example in FIG. 3 in exploded view. Such a diode array is commercially from Hamamatsu Corporation of Japan. The sensor has a width of about 2 mm and a length of about 20 mm, and can be used with a correspondingly sized optical panel 14 with one or more of the diodes adjoining each of the waveguides 16 for detecting the return beams therein. This exemplary sensor is effective for detecting visible or infrared light, and has additional advantages as described hereinbelow.

A particular advantage of using the optical panel 14 for not only broadcasting the scan lines, but for receiving the return beams 24b is that it provides a large collection area for the return light scattered from the individual barcodes. Since the light is scattered from the barcodes in all return directions therefrom the light may be received over the entire area of the screen 20. Since the individual waveguides 16 have continuous widths across the entire width of the screen itself, any return light entering any of the waveguides can be detected at any location along the width of the inlet face 18, and in particular at the end thereof at which the light sensor 26 is mounted.

Although a single photodiode may be used, multiple photodiodes ensure the capture of the strongest return beam 24b from the barcode since most if not all of the many waveguides may be monitored by the sensor. The output of the many photodiodes may be decoded separately, or may be combined into a single signal, if desired, for ensuring a strong signal to the decoder 28 illustrated in FIG. 1 for decoding the barcode being scanned.

Another particular advantage of the optical panel 14 illustrated in FIG. 1 is that the projector 22 may be configured for projecting into a common panel 14 both the scan beam 24 and a video image beam 24c substantially simultaneously. The scan line pattern generator 22d controls the scan beam 24 to form the scan line pattern emitted from the screen 20. Correspondingly, a similar video image generator 22e is configured for forming a different visual display image on the screen 20 for viewing.

For example, the display image illustrated in FIG. 1 identifies the exemplary store and includes a list of the products being purchased and their scanned prices. The display image may be in any suitable form such as a typical grocery receipt, which may be subsequently printed upon completion of the transaction. The common projector 22 is therefore configured for displaying both the scan beam for scanning the barcodes, and a video beam for displaying an image substantially simultaneously with the scanning operation.

The image optics 22c of the projector illustrated in FIG. 1 may include suitable focusing lenses to ensure a correspondingly small resolution of the projected scan beams which should be suitably smaller than the minimum width of the bars and spaces of the barcode for decoding thereof. However since it is desirable to focus the video beam 24c at the plane of the screen 20 for obtaining a focused image, it is also desirable to focus the scan lines 24a at a suitable point outwardly from the screen 20 along which the barcodes are intended to be swiped.

The imaging optics 22c may therefore be specifically tailored for providing different focusing for the scan beam 24 and the video beam 24c if practical. For example, the optics 22c may include a variable focus zoom lens having a suitably fast, adjustable focal plane for the different focusing requirements of the scan and video beams.

Or, in an alternate embodiment illustrated in phantom in FIG. 1, a separate projector, designated 22B, may be used in conjunction with the original projector 22. The one projector 22 may be specifically configured for projecting the scan beam 24 and its corresponding scan line pattern focused at one depth away from the screen 20, whereas the second projector 22B may be specifically configured for producing the video beam 24c focused at the screen 20. In this embodiment, both projectors 22, 22B are in the form of separate and dedicated video display projectors suitably configured to optimize their different use.

Figure 3:
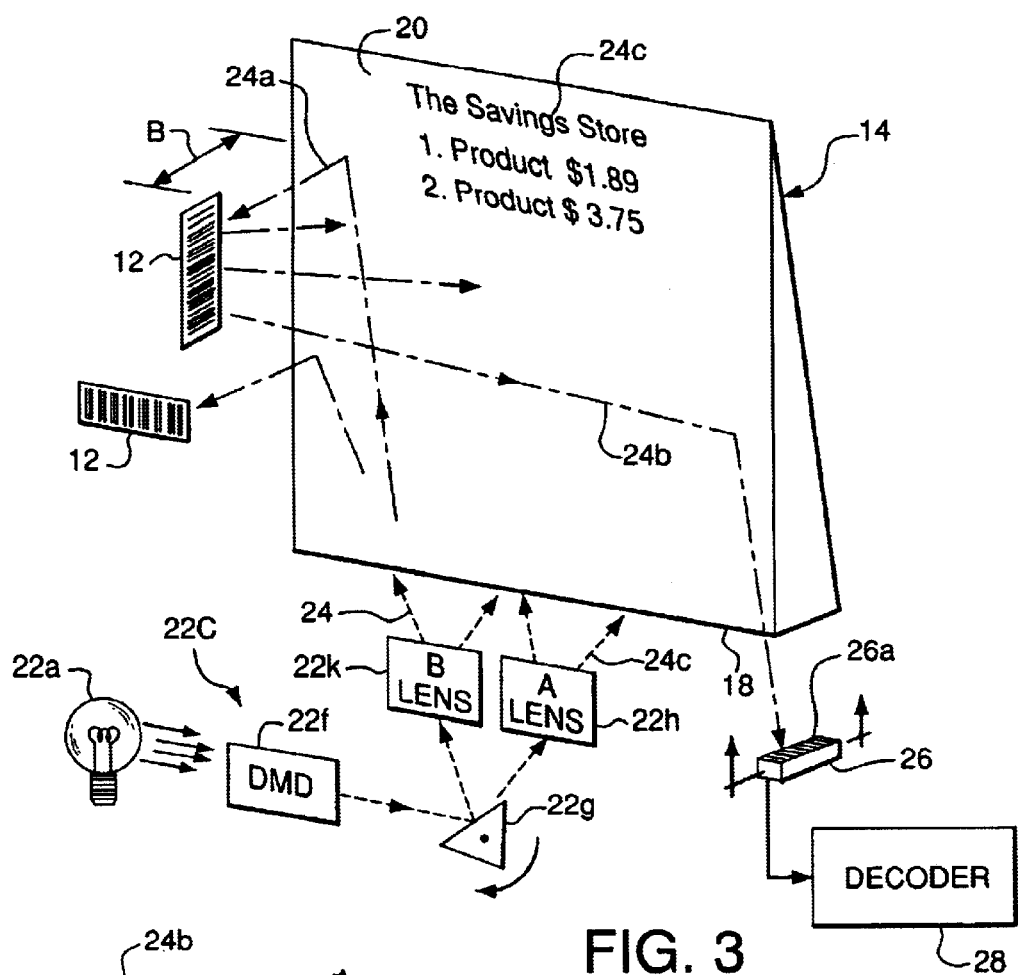
FIG. 3 is a schematic view of an integrated display scanner in accordance with another embodiment of the present invention.

FIG. 3 illustrates an alternate embodiment of the integrated display scanner which is identical to that illustrated in FIG. 1 except for a different form of the projector, designated 22C. In this embodiment, the light source 22a, such as an incandescent lamp, is incorporated with a light modulator 22f in the form of a Digital Micromirror Device (DMD). The DMD component is commercially available from Texas Instruments, Inc., Dallas, Tex., and is characterized as a semiconductor light switch having individual micromirrors which are separately addressed for differently tilting the individual mirrors. The DMD 22f permits the generation of an image formed with individual pixels defined by the individual micromirrors either reflecting light into the optical panel 14 or diverting it thereaway.

The DMD 22f may be used in conjunction with a suitable light deflector 22g, such as a rotary spinner, for preferentially directing the light beams towards one of two image optics systems 22h and 22k having corresponding focusing lenses, mirrors, or combinations thereof. The first system 22h is configured to focus the video beam 24c at the screen 20. The second system 22k is configured to focus the scan beam 24 outside or away from the screen 20 at a corresponding spacing B for maximizing focus on the barcodes swiped at this location.

Figure 4:
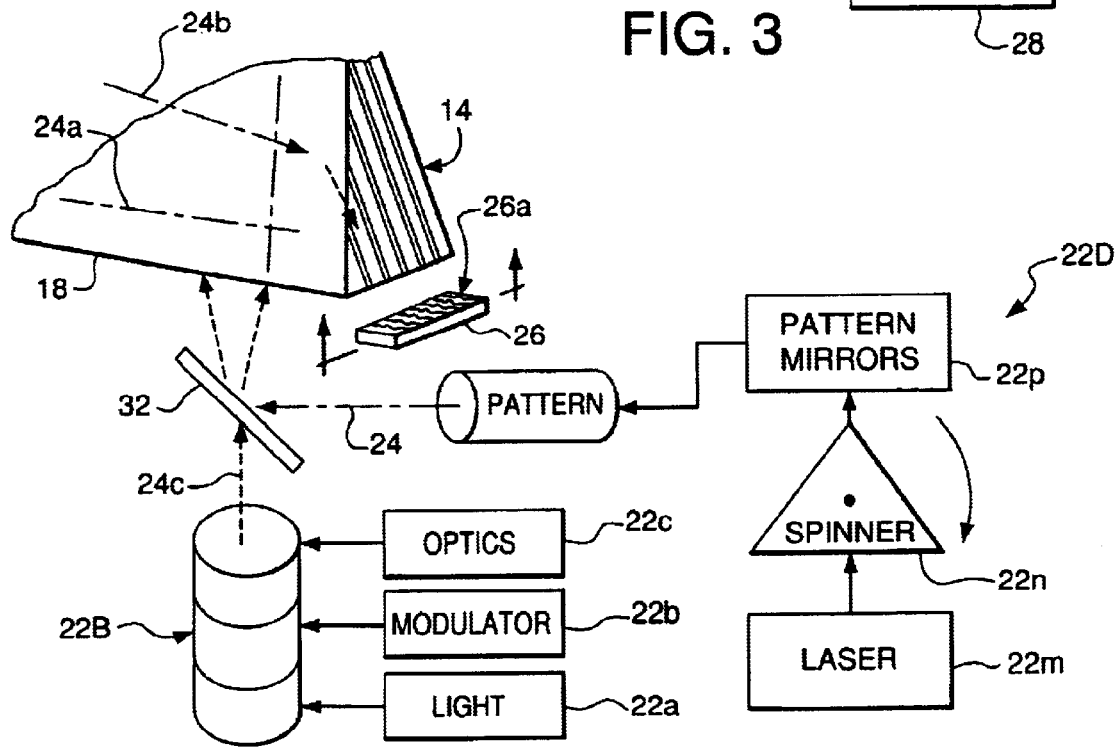
FIG. 4 is a schematic view of a portion of an optical panel in accordance with another embodiment of the present invention.

FIG. 4 illustrates yet another embodiment of the display scanner which is identical to the FIG. 1 embodiment except for the use of two different projectors 22B and 22D configured for separately projecting the scan beam 24 and the video beam 24c into the panel. Like the optional embodiment illustrated in FIG. 1, the embodiment illustrated in FIG. 4 includes an independent video display projector 22B for projecting the video beam 24c into the panel 14.

Another, and independent, projector designated 22D, may be in the form of a conventional barcode scanner for independently producing the scan beam 24. The barcode projector 22D includes a conventional laser 22m which emits a laser beam toward a rotary spinner 22n having a plurality of mirror facets which reflect the laser beam in turn along a plurality of pattern mirrors 22p that produce a pattern of scan lines directed into the panel 14. The rotating spinner 22n interrupts the laser beam to form a plurality of the scan lines in each revolution of the spinner generated by reflection off the corresponding pattern mirrors in any conventional manner.

In the exemplary embodiment illustrated in FIG. 4, a suitable beam combiner 32 is optically aligned with the separate projectors 22B, 22D for combining both scan and video beams 24, 24c into the inlet face of the panel.

The scan beam projector 22D is preferably configured for transmitting an infrared scan beam 24, and the video projector 22B is configured for transmitting a visible video beam 24c. The beam combiner 32 may be in the simple form of a dichroic mirror which cooperates with the different wavelengths of the infrared scan beam 24 and the visible video beam 24c. By mounting the dichroic mirror 32 obliquely to both projectors, the visible video beam 24c may be transmitted through the mirror, whereas the infrared scan beam 24 is reflected off the mirror, with both beams then following the same general path into the inlet face of the optical panel.

These exemplary embodiments of the integrated display scanner show the considerable versatility of using the optical display panel 14 in a new barcode scanning apparatus, which may be further integrated with a video display. The common screen 20 may be used for both scanning a barcode swiped thereacross while also displaying any useful information thereon as desired. Although the exemplary embodiments have been disclosed for a typical POS terminal, the invention may be used wherever beneficial. For example, the invention may be incorporated in any device having a video display screen for which the ability to scan data directly therein is also desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

What is claimed is:

1. A display scanner for reading a barcode comprising:
   an optical panel including a plurality of stacked parallel optical waveguides defining an inlet face at one end and a screen at an opposite end, wherein each of said waveguides has a core laminated between cladding, and wherein said waveguides are planar;
   a projector optically aligned with said inlet face for projecting a scan beam of light into said panel for transmission from said screen as a scan line to scan said barcode;
   a light sensor disposed in optical communication with said inlet face for detecting a return beam reflected from said barcode into said screen; and
   a decoder operatively joined with said sensor for decoding said return beam detected by said sensor to read said barcode.

2. A scanner according to claim 1 wherein said projector further comprises a pattern generator for defining a plurality of said scan lines with different orientations in a collective pattern at said screen for reading different orientations of said barcode.

3. A scanner according to claim 2 wherein said projector comprises a rotary spinner and cooperating pattern mirrors for interrupting said scan beam into said scan lines in each revolution of said spinner.

4. A scanner according to claim 2 further comprising a light coupler disposed on said screen for transmitting said scan lines outwardly therefrom.

5. A scanner according to claim 4 wherein said coupler comprises fresnel prismatic grooves.

6. A scanner according to claim 5 wherein said waveguides are oblique to said inlet face and screen.

7. A scanner according to claim 6 wherein said coupler is configured to turn said scan beam in a range of about 45° to about 90°.

8. A scanner according to claim 5 wherein said coupler comprises a transmissive right angle film.

9. A scanner according to claim 1 wherein said sensor comprises a photodiode adjoining said inlet face.

10. A scanner according to claim 9 wherein said sensor is disposed at one end of said inlet face out of range of said projector.

11. A scanner according to claim 9 wherein said sensor comprises a photodiode array adjoining respective ones of said waveguides for providing redundant detection of respective ones of said return beams.

12. A display scanner for reading a barcode comprising:
    an optical panel including a plurality of stacked optical waveguides defining an inlet face at one end and a screen at an opposite end, and each of said waveguides has a core laminated between cladding;
    a projector optically aligned with said inlet face for projecting a scan beam of light into said panel for transmission from said screen as a scan line to scan said barcode, wherein said projector further comprises a pattern generator for defining a plurality of said scan lines with different orientations in a collective pattern at said screen for reading different orientations of said barcode, and wherein said projector comprises a video display projector configured to display said pattern as a video image thereof;
    a light sensor disposed in optical communication with said inlet face for detecting a return beam reflected from said barcode into said screen; and
    a decoder operatively joined with said sensor for decoding said return beam detected by said sensor to read said barcode.

13. A scanner according to claim 12 wherein said waveguides are planar.

14. A display scanner for reading a barcode comprising:
    an optical panel including a plurality of stacked optical waveguides defining an inlet face at one end and a screen at an opposite end, and each of said waveguides has a core laminated between cladding;
    a projector optically aligned with said inlet face for projecting a scan beam of light into said panel for transmission from said screen as a scan line to scan said barcode, wherein said projector further comprises a pattern generator for defining a plurality of said scan lines with different orientations in a collective pattern at said screen for reading different orientations of said barcode, and wherein said projector is configured for projecting into said panel both said scan beam and a video beam, with said scan beam forming said scan line pattern at said screen, and said video beam forming a visual display image;
    a light sensor disposed in optical communication with said inlet face for detecting a return beam reflected from said barcode into said screen; and
    a decoder operatively joined with said sensor for decoding said return beam detected by said sensor to read said barcode.

15. A scanner according to claim 14 wherein said projector comprises a common video display projector configured to display both said scan beam and video beam.

16. A scanner according to claim 15 wherein said projector further comprises a light source for producing said light beam, a modulator for modulating said light beam to form said scan line pattern and display image, and image optics for broadcasting said light beam horizontally and vertically across said inlet face for transmission through said waveguides to display said pattern and image on said screen.

17. A scanner according to claim 16 wherein said modulator comprises a digital micromirror device.

18. A scanner according to claim 14 wherein said projector comprises separate projectors configured for separately projecting said scan beam and video beam into said panel.

19. A scanner according to claim 18 wherein said projectors both comprise video display projectors.

20. A scanner according to claim 18 wherein one of said projectors comprises a video display projector for projecting said video beam, and another projector comprises a rotary spinner and cooperating pattern mirrors for interrupting said scan beam into said scan lines in each revolution of said spinner.

21. A scanner according to claim 18 further comprising a beam combiner optically aligned with said separate projectors for combining said scan and video beams into said panel.

22. A scanner according to claim 21 wherein said beam combiner comprises a dichroic minor.

23. A scanner according to claim 18 wherein said scan beam projector is configured for transmitting an infrared scan beam, and said video projector is configured for transmitting a visible video beam.

24. A scanner according to claim 14 wherein said projector includes corresponding image optics to focus said video beam at said screen, and to focus said scan beam outside said screen.

25. A scanner according to claim 14 wherein said waveguides are planar.

* * * * *